Figure 1:
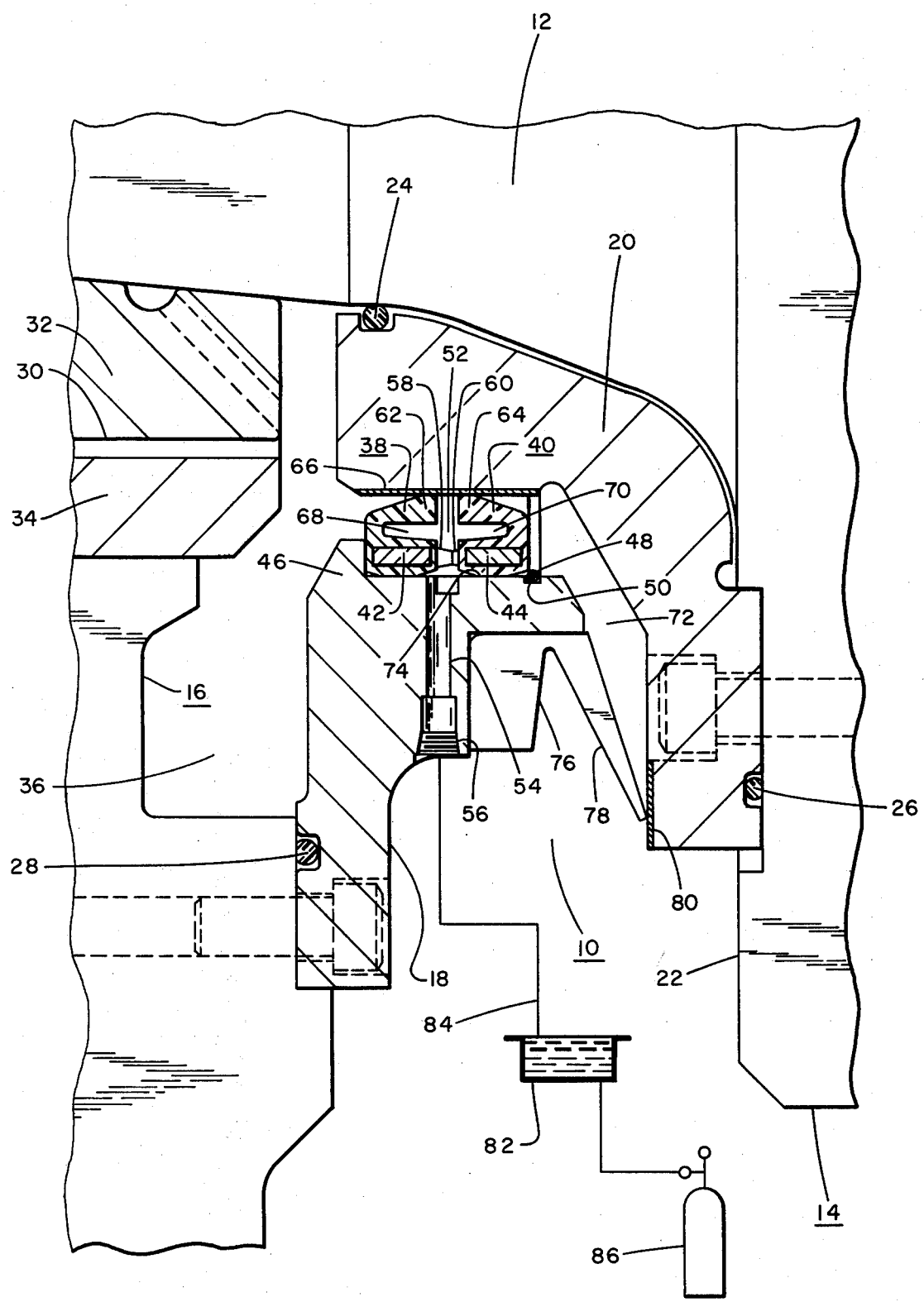

United States Patent [19]

Petros

[11] 4,063,743
[45] Dec. 20, 1977

[54] SEALING ARRANGEMENT FOR A ROTATABLE MEMBER

[75] Inventor: Andrew J. Petros, Oakdale, Pa.

[73] Assignee: Mesta Machine Company, Pittsburgh, Pa.

[21] Appl. No.: 696,123

[22] Filed: June 14, 1976

[51] Int. Cl.² .............................................. F16J 15/32
[52] U.S. Cl. ..................................... 277/63; 277/95; 277/135
[58] Field of Search ............... 277/95, 63, 135, 206 R, 277/81 R, 70, 215

[56] References Cited

U.S. PATENT DOCUMENTS

| 2,501,944 | 3/1950 | Jaeger et al. | 277/135 |
| 2,528,895 | 11/1950 | Mathews | 277/206 |
| 2,736,265 | 2/1956 | Higgins | 277/95 |
| 2,882,081 | 4/1959 | Tobias | 277/95 |
| 2,935,860 | 5/1960 | Miller | 277/206 |
| 3,054,620 | 9/1962 | Schwing | 277/95 |
| 3,306,042 | 2/1967 | Crooks | 277/206 |

Primary Examiner—Richard E. Aegerter
Assistant Examiner—L. Footland
Attorney, Agent, or Firm—Smith and Carothers

[57] ABSTRACT

A sealing arrangement is disclosed for sealing a stationary member to a rotatable member and comprises a pair of rubbing seals mounted on one of the rotatable and stationary members in rubbing engagement with the other of the members. The rubbing seals are relatively closely spaced to form a sealant space therebetween extending radially from the rotatable member to the stationary member and circumferentially and continuously about the rotatable member. The stationary member has a sealant passage extending therethrough in communication with the sealant space. An arrangement is provided for injecting fluid sealant through the sealant passage and into the sealant space so that the sealant space is completely filled with sealant to form a continuous sealing band of fluid sealant extending circumferentially about the rotatable member.

6 Claims, 1 Drawing Figure

SEALING ARRANGEMENT FOR A ROTATABLE MEMBER

The present invention relates to a sealing arrangement for a rotatable member, and more particularly to apparatus and method of the character described for minimizing or preventing altogether the leakage of oil or other lubricant from the bearings of a rotatable member and for preventing entry of foreign matter.

The sealing arrangement of the invention is especially adapted for reduction of loss of lubricant and the introduction of foreign matter with respect to the back-up roll lubricant systems of rolling mills. The novel sealing arrangement, however, is applicable to a wide range of similar and other applications involving the sealing of relatively large bearing arrangements. In general the sealing arrangement is useful in a great many applications where it is essential to seal a stationary member to a rotatable member. Although the invention is primarily described in the context of a rolling mill, it will be evident from the ensuing description that the invention is of general utility.

In the case of mill rolls, it is necessary to have a constantly recirculating oil flow through the journals of high load capacity oil bearings. In many operating installations, the rolling mill bearings are situated in an environment involving exposure to deluges of water or other coolant liquids and exposure to oxide and metal fines, as well as larger chips and slivers. Effective sealing is therefore necessary between the stationary lubricant and bearing chocks and the rotating mill rolls. The leakage of oil or other lubricants and the introduction of the aforementioned and other foreign matter into the lubricant system of the rolling mill cause obviously serious and costly maintenance problems. Bearing life can be drastically reduced if adequate sealing arrangements are not provided.

Prior sealing arrangements have employed a large number of component parts, which in addition to complicating initial manufacture and installation, have also rendered roll changes and dechocking both difficult and time consuming. In addition, overly complicated prior sealing arrangements have interferred with a proper maintenance schedule.

Previous sealing arrangements have also failed to compensate for inevitable eccentricities of the rotating member. These sealing arrangements in consequence were subject to rapid wearing and to aggravated leakage conditions. In the case of rolling mills, eccentricities in the roll necks may be as much as 40 - 60 mils.

The complexity of prior sealing arrangements for these and other rotating members have also lacked in most cases a proper visual access. Frequent visual inspections are necessary to ascertain the proper functioning of the sealing arrangement and to gauge the amount of wear, potential leakage, and the like.

In contrast, the sealing arrangement of the present invention defines a sealing band of grease or other fluid sealant to perform the actual sealing function between a stationary member and an associated rotatable member. Considerable eccentricity can be accommodated without impairment of the sealing function. In many applications a lighter lubricant or other sealant can be employed in substitution for the aforementioned band of grease. The sealing arrangement of the invention is further configured such that very little of a relatively high vecosity sealant escapes from either side of the sealing arrangement — in the case of mill rolls, either into the lubricant system being sealed on one side of the sealing arrangement or into the ambient or other system on the other side.

Desirably a compatible material for the sealant band is selected such that the same will melt or dissolve into the lubricant of my bearing system that may be sealed thereby, without any contaminating influence. In one arrangement of the invention a zero pressure differential is maintained between the sealing arrangement of the invention and an adjacent lubricant system being sealed by the aforementioned sealing band, to minimize leakage therebetween or to prevent it altogether.

The sealing arrangement of the invention is constructed from a minimum of component parts and, as set forth below, is configured for minimizing or preventing the passage of lubricant or other foreign material through an annular space between stationary and rotating members. The sealing arrangement of the invention has an extended life as wear is considerably reduced by usage of the aforementioned fluid sealing band.

The invention accomplishes these desirable aims by providing a sealing arrangement for sealing a stationary member to a rotatable member, said arrangement comprising a pair of rubbing seals mounted on one of said rotatable and said stationary members in rubbing engagement with the other of said members, said rubbing seals being relatively closely spaced to form a sealant space therebetween extending radially from said rotatable member to said stationary member and circumferentially and continuously about said rotatable member, said stationary member having a sealant passage extending therethrough in communication with said sealant space, and means for injecting fluid sealant through said passage and into said sealant space so that said sealant space is completely filled with said sealant to form a continuous sealing band of said sealant extending circumferentially about said rotatable member.

The invention also provides a method for sealing a rotating member to a stationary member, said method comprising the steps of positioning a pair of rubbing seals between said members, spacing said seals to define a sealant space therebetween extending continuously and circumferentially about said rotating member and extending radially substantially between said rotating and said stationary members, and filling said sealant space with pressurized fluid sealant to form a continuous band of said sealant extending uninterruptedly and circumferentially about said rotating member to prevent leakage through an annular space between said members.

During the foregoing discussion, various objectives, features and advantages of the invention have been set forth. These and other objectives, features and advantages of the invention together with structural details thereof will be elaborated upon during the forthcoming description of certain presently preferred embodiments of the invention and presently preferred methods of practicing the same.

In the accompanying drawings there are illustrated certain presently preferred embodiments of the invention together with certain presently preferred methods of practicing the same wherein:

FIG. 1 is a partial, longitudinally sectioned view of a mill roll and mill roll bearing chock, with the sealing arrangement of the invention mounted therebetween.

With a more detailed reference to the drawing FIGURE, the sealing arrangement 10 of the invention is arranged for sealing a rotatable member such as roll neck 12 of mill roll 14 to mill roll chock 16. More particularly, the sealing arrangement 10 is configured to seal its holder 18, which in this example is bolted to the bearing chock 16, to roll neck adaptor or wearing ring 20, which in turn can be bolted to end face 22 of the mill roll 14 for rotation therewith. The roll neck adaptor 20 can be sealed to adjacent surfaces of the roll neck 12 and the roll end face 22 by means of O-rings 24, 26 respectively. Likewise, the stationary sealing arrangement holder 18 can be sealed to the bearing chock 16 by means of O-ring 28. Other suitable sealing means can, of course, be substituted for the O-rings 24-28 depending upon the application of the invention.

From the drawing FIGURE as thus far described, it is readily apparent that the sealing arrangement 10 is capable of preventing leakage of lubricant from oil film 30 maintained between tapered neck sleeve 32 and bearing sleeve 34 of the roll chock 16. This function of the sealing arrangement 10, along with its correlative function of preventing the introduction of foreign matter will be described in greater detail below. Oil or other lubricant is circulated through the oil film space or area 30 by a conventional lubricant system (not shown) forming part of or coupled to the bearing chock 16. In addition to its primary lubricating function, the circulating lubricant system also dissipates heat from the bearing chock and associated components. Weepage space 36 enclosed between the sealing arrangement holder 18, the bearing chock 16, and roll neck 12 and associated components provides a sump for inevitable lubricant leakage from the oil film space 30.

In this arrangement of the invention, the sealing arrangement 10 comprises a pair of rubbing seals 38, 40 which desirably are disposed opposing each other between the sealing arrangement holder 18 and the roll neck adaptor 20. The rubbing seals 38, 40 can be fabricated from an elastomeric material such as nitrile and are stabilized by a steel band 42 or 44. The rubbing seals 38, 40 together with their reinforcing bands 42, 44 extend continuously and circumferentially about the adjacent portions of the roll neck 12. In the illustrated embodiment of the invention the rubbing seals 38, 40 are captivated between shoulder 46 of the holder 18 and a snap ring 48 or the like seated in groove 50 of the aforesaid holder.

When thus disposed the rubbing seals 38, 40 define a grease or other sealing fluid band 52 therebetween which likewise extends continuously and circumferentially about the roll neck 12 and the roll neck adaptor 20. The sealant band 52, as confined and delimited by the rubbing seals 38, 40, also extends radially from the rotatable member or roll neck adaptor 20 to the stationary member or holder 18. The sealing band 52 of lubricant communicates with lubricant passage 54 extending radially outwardly through the sealing arrangement holder 18 and terminating in a threaded fitting engagement area 56. A suitable source 82 of pressurized lubricant or other sealing fluid is coupled thereto as described below.

The aforementioned sealant band 52 is defined by the rubbing seals 38, 40 which are relatively closely spaced for this purpose between the rotatable and stationary members (in this case the roll neck adaptor 20 and holder 18) by a number of protuberances 58, 60 extending respectively from the rubbing seals 38, 40 and positioned for engagement therebetween. The protuberances 58, 60 desirably are formed integrally and respectively with the rubbing seals 38, 40 and can be equally spaced around the confronting surfaces thereof for abutting confrontation as shown in the drawing FIGURE. Obviously the protuberances can be extended from a single one of the rubbing seals 38, 40 so as to abut the other rubbing seal directly.

When thus assembled the rubbing lips or surfaces 62, 64 of the rubbing seals 38, 40 respectively bearingly engage the roll neck adaptor or wearing ring 20. The adjacent surfaces of the wearing ring 20 can be reinforced by a bonded layer 66 of ceramic material or other suitable long wearing material to provide a smooth, corrosion-free, and wear-resistant surface. The wearing ring 20 is of course readily replaceable as are other components associated with the sealing arrangement 10.

Communicating with the lubricant band 52 are a pair of laterally and circumferentially extending channel means, including in this case laterally extending cavities 68, 70. The cavities extend respectively into the symmetrically opposing rubbing seals 38, 40 and desirably between the rubbing lips 62, 64 and reinforcing bands 42, 44 thereof. When grease or other sealing fluid is introduced under pressure through the passage 54 the sealing fluid is forced into the circumferential sealing band 52 and also into the laterally extending cavities 68, 70. The sealant band 52 is defined and confined by the circumferential rubbing lips 62, 64 and other confronting portions of the rubbing seals 38, 40. The lubricant sealing band 52, therefore, positively prevents the escape of lubricant from the weepage area or sump 36, and also positively prevents the entry of foreign material from circumferential space 72 on the other side of the sealing arrangement 10 into the sump 36 and other areas of the bearing chock 16, including most importantly the lubricant film 30. In many applications the grease or other sealant supplied under pressure to the sealing arrangement 10 and particularly the sealant band 52 thereof is maintained under a pressure at least as great as that prevailing within the bearing chock 16 including particularly the lubricant film area 30.

As evident from the drawing, the lateral sealant cavities 68, 70 are maintained under that pressure prevailing within the sealing band 52. Accordingly the pressurized sealant within the cavities cooperates with the reenforcing bands 42, 44 to seat and to seal properly the rubbing seals 38, 40 against the inner periphery 74 of the sealing arrangement holder 18. Even more importantly, the pressurized sealant within the lateral passages 68, 70 cooperates with the natural resiliency of the rubbing seals 38, 40 to force the rubbing lips 62, 64 thereof into sealing engagement with the ceramic or other wearing surface 66 of the wearing ring 20. In this way any eccentricities of the roll neck 12 or of the wearing ring 20 are readily accommodated without significant loss of sealant from the sealing band 52. Desirably the grease or other sealant filling the sealing band 52 is selected such that any leakage therefrom that may occur in the direction of the sump 36 will melt or dissolve into any lubricant within the sump 36. Any leakage of sealant in the opposite direction (i.e. past the rubbing seal 40 can be collected in the circumferential space 72).

As pointed out previously the environment of the sealing arrangement 10 (as applied to rolling mills or the like) frequently includes deluges of cooling water, metallic dust and chips, and other corrosive or abrasive foreign material. These and other foreign materials are readily excluded from the space 72, from the sealing arrangement 10 and hence from the bearing chock 16 and associated components by a conventional rubbing seal 76 mounted on the holder 18 and likewise extending circumferentially about the roll neck 12 and its wearing ring or adaptor 20. The seal 76 desirably includes a circumferential, flexible flange 78 which bears against an adjacent portion of the wearing ring 20, which is likewise provided with a layer 80 of ceramic or other wear-resistant material.

It will now be evident that the actual sealing function of the sealing arrangement 10 is performed by the sealant band 52, which extends radially from the rotatable member (comprising in this example the roll neck 12 and the annular wearing ring 20) radially and outwardly to the stationary member or holder 18. The sealant space 52 also extends circumferentially and uninterruptedly or continuously about the rotatable member or wearing ring 20.

In operation, a mineral-oil based grease or other suitable sealant is supplied to the sealing space or band 52 from a suitable reservoir or container 82 through the radial passage 54. The lubricant reservoir 82 is coupled to the annular holder 18 at its fitting area 56 through a suitable connecting conduit denoted schematically at 84. A source 86 of compressed air or the like, coupled to the reservoir 82, can be utilized to force the lubricant into the sealant band 52 through the several connecting conduits. Alternatively a suitable lubricant pump (not shown) or the like can be thus employed. When the sealant space 52 is completely filled with fluid sealant, a continuous lubricant or other sealing band entirely surrounds the rotatable member. Desirably the sealant band 52 is maintained under the same pressure as that applied to the lubricant within the bearing chock 16. This minimizes or prevents altogether any tendency of leakage between the lubricant system of the bearing chock 16 and the sealing arrangement 10. Unexpectedly, the pressurized sealant band 52 including the pressurized sealant filling the channel means 68, 70 allows the sealing arrangement 10 to compensate readily for any eccentricities of the rotatable member 12/20, even at the higher rotative speeds.

From the foregoing it will be seen that a novel and efficient Sealing Arrangement For A Rotatable Member has been disclosed and described. The descriptive and illustrative materials employed herein utilized for purposes of exemplifying the invention and not in limitation thereof. Accordingly, numerous modifications of the invention will occur to those skilled in the art without departing from the spirit and scope of the invention. It is to be understood that certain features of the invention can be used to advantage without a corresponding use of other features thereof.

I claim:

1. A sealing arrangement for sealing a stationary member to a rotatable member, said arrangement comprising a stationary member and a rotatable member, a pair of rubbing seals mounted on one of said rotatable and said stationary members in rubbing engagement with a cylindrical surface of the other of said members, said rubbing seals being relatively closely spaced to form a sealant space therebetween extending radially from said rotatable member to said stationary member and circumferentially and continuously about said rotatable member, said stationary member having a sealant passage extending therethrough in communication with said sealant space, means for injecting fluid sealant through said passage and into said sealant space so that said sealant space is completely filled with said sealant to form a continuous sealing band of said sealant extending circumferentially about said rotatable member, and said sealant space including opposed and laterally extending channel means communicating therewith and extending behind opposed rubbing lips of said rubbing seals respectively to increase the flexibility thereof and to positively engage said lips with said other member and wherein said rubbing seals are symmetrically opposed with respect to one another; and including said rotatable member configured as a roll neck and wearing ring mounted thereon, and further including, said stationary member configured as a bearing chock for said roll neck.

2. The combination according to claim 1 wherein said rubbing seals are discretely formed members maintained in relatively closely spaced separation by a series of protuberances extending from at least one of said seals.

3. The combination according to claim 2 wherein said rubbing seals are mounted on said stationary member and are confined thereon between an annular shoulder thereof and a snap ring mounted thereon.

4. The combination according to claim 1 including annular stiffening means embedded in said rubbing seals and disposed remotely from the rubbing lips thereof, said channel means being disposed generally between said stiffening means and said lips.

5. The combination according to claim 1 wherein said stationary member further includes an annular holder for said sealing arrangement secured to said bearing chock and configured to form an enclosed annular space between an area of said bearing chock supplied with lubricant and said sealing arrangement.

6. The combination according to claim 5 including a third rubbing seal mounted on said holder for rubbing engagement with said wearing ring at a location outwardly of said sealing arrangement with respect to said lubricant supplied area.

* * * * *